United States Patent
Ujihara et al.

(10) Patent No.: US 10,280,865 B2
(45) Date of Patent: *May 7, 2019

(54) ENGINE CONTROL DEVICE

(71) Applicant: MAZDA MOTOR CORPORATION, Hiroshima (JP)

(72) Inventors: Kenko Ujihara, Higashihiroshima (JP); Hiroaki Shiiba, Hiroshima (JP); Takeshi Matsubara, Hiroshima (JP); Naotoshi Shirahashi, Hiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/762,510

(22) PCT Filed: Oct. 14, 2016

(86) PCT No.: PCT/JP2016/080584
§ 371 (c)(1),
(2) Date: Mar. 22, 2018

(87) PCT Pub. No.: WO2017/073376
PCT Pub. Date: May 4, 2017

(65) Prior Publication Data
US 2018/0266356 A1 Sep. 20, 2018

(30) Foreign Application Priority Data

Oct. 30, 2015 (JP) .................................. 2015-214613

(51) Int. Cl.
*F02D 41/30* (2006.01)
*F02D 41/22* (2006.01)
(Continued)

(52) U.S. Cl.
CPC ......... *F02D 41/3017* (2013.01); *F02D 41/22* (2013.01); *F02D 41/3035* (2013.01);
(Continued)

(58) Field of Classification Search
CPC .. F02D 41/3017; F02D 41/38; F02D 41/3035; F02D 41/40; F02D 41/22;
(Continued)

(56) References Cited

U.S. PATENT DOCUMENTS

2012/0209489 A1 8/2012 Saito et al.
2018/0274462 A1* 9/2018 Ujihara ............... F02D 41/1456

FOREIGN PATENT DOCUMENTS

JP 2011-088576 A 5/2011
JP 2014-166014 A 9/2014

OTHER PUBLICATIONS

International Preliminary Report on Patentability and Written Opinion issued in PCT/JP2016/080584; dated May 1, 2018.
(Continued)

*Primary Examiner* — Hai H Huynh
(74) *Attorney, Agent, or Firm* — Studebaker & Brackett PC

(57) ABSTRACT

Provided is a control device for an engine comprising an engine whose combustion mode is switchable according to an engine operation state, wherein the control device is capable of controlling the engine while suppressing generation of knock noise due to abnormal combustion. The control device comprises: a basic target torque-determining part (61) configured to determine a basic target torque based on a vehicle driving state including manipulation of an accelerator pedal; a torque reduction amount-determining part (63) configured to determine a torque reduction amount based on a vehicle driving state other than the manipulation of the accelerator pedal; a final target torque-determining
(Continued)

part (65) configured to determine a final target torque based on the basic target torque and the torque reduction amount; and an engine control part (69) configured to set the combustion mode to a premixed combustion mode or a diffusion combustion mode according to the engine operation state. The engine control part is configured, when the engine operation state changes from a diffusion combustion region to a premixed combustion region, due to a change in the final target torque corresponding to a change in the torque reduction amount, to maintain the combustion mode in the diffusion combustion mode.

4 Claims, 9 Drawing Sheets

(51) Int. Cl.
   *F02D 41/40* (2006.01)
   *F02D 41/38* (2006.01)
   F02D 41/04 (2006.01)
   F02D 41/00 (2006.01)
(52) U.S. Cl.
   CPC .............. *F02D 41/38* (2013.01); *F02D 41/40* (2013.01); *F02D 41/0007* (2013.01); *F02D 41/0047* (2013.01); *F02D 41/04* (2013.01); *F02D 2041/389* (2013.01); *F02D 2200/1002* (2013.01); *F02D 2200/501* (2013.01); *F02D 2200/602* (2013.01); *F02D 2200/604* (2013.01); *F02D 2200/703* (2013.01); *F02D 2250/26* (2013.01); *Y02T 10/44* (2013.01)
(58) Field of Classification Search
   CPC .. F02D 41/0007; F02D 41/0047; F02D 41/04; F02D 2041/389; F02D 2200/602; F02D 2200/501; F02D 2200/1002; F02D 2200/604; F02D 2200/703; F02D 2250/26; F02D 2250/18; F02D 2250/22
   USPC .......................................... 123/436; 701/110
   See application file for complete search history.

(56) References Cited

OTHER PUBLICATIONS

International Search Report issued in PCT/JP2016/080584; dated Jan. 10, 2017.

\* cited by examiner

FIG.8
(a)
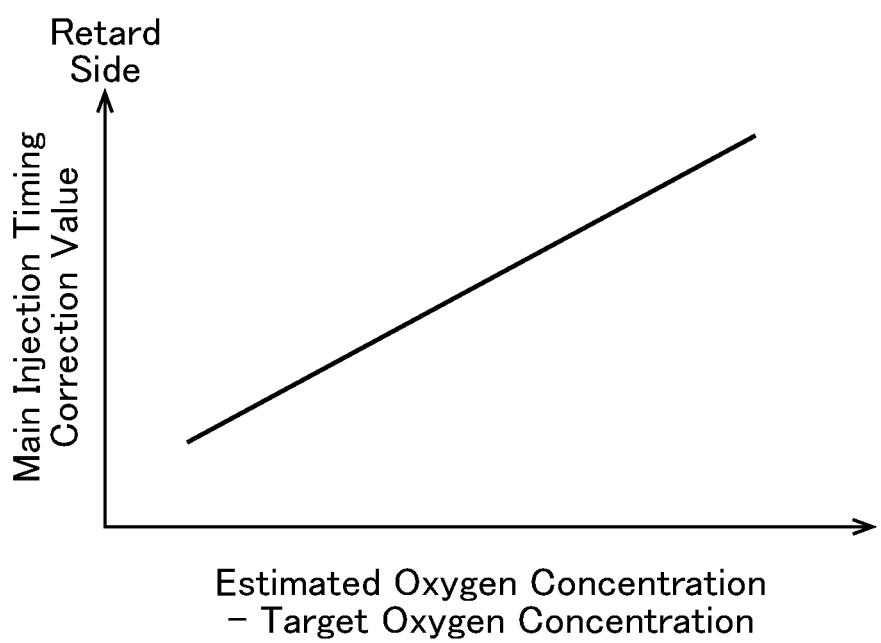
(b)
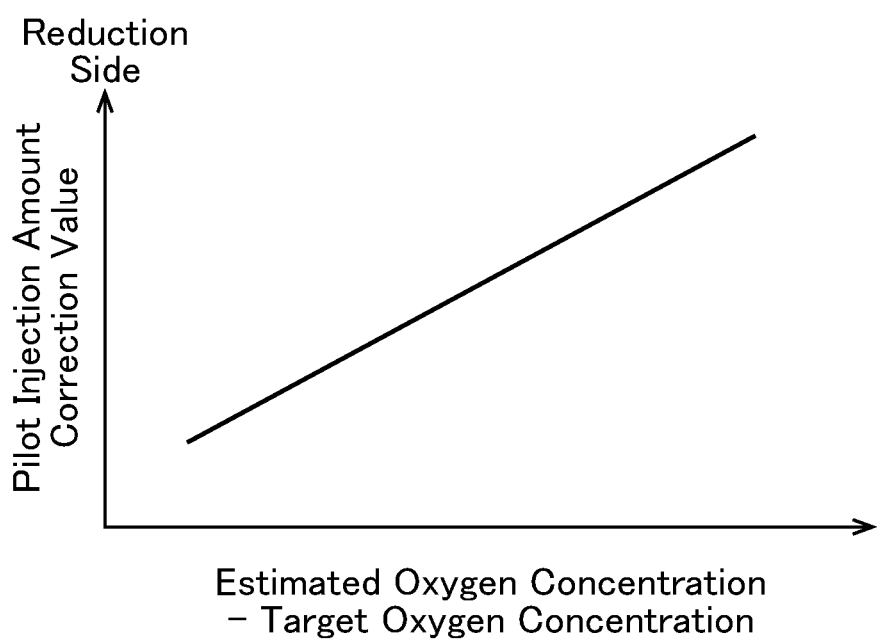

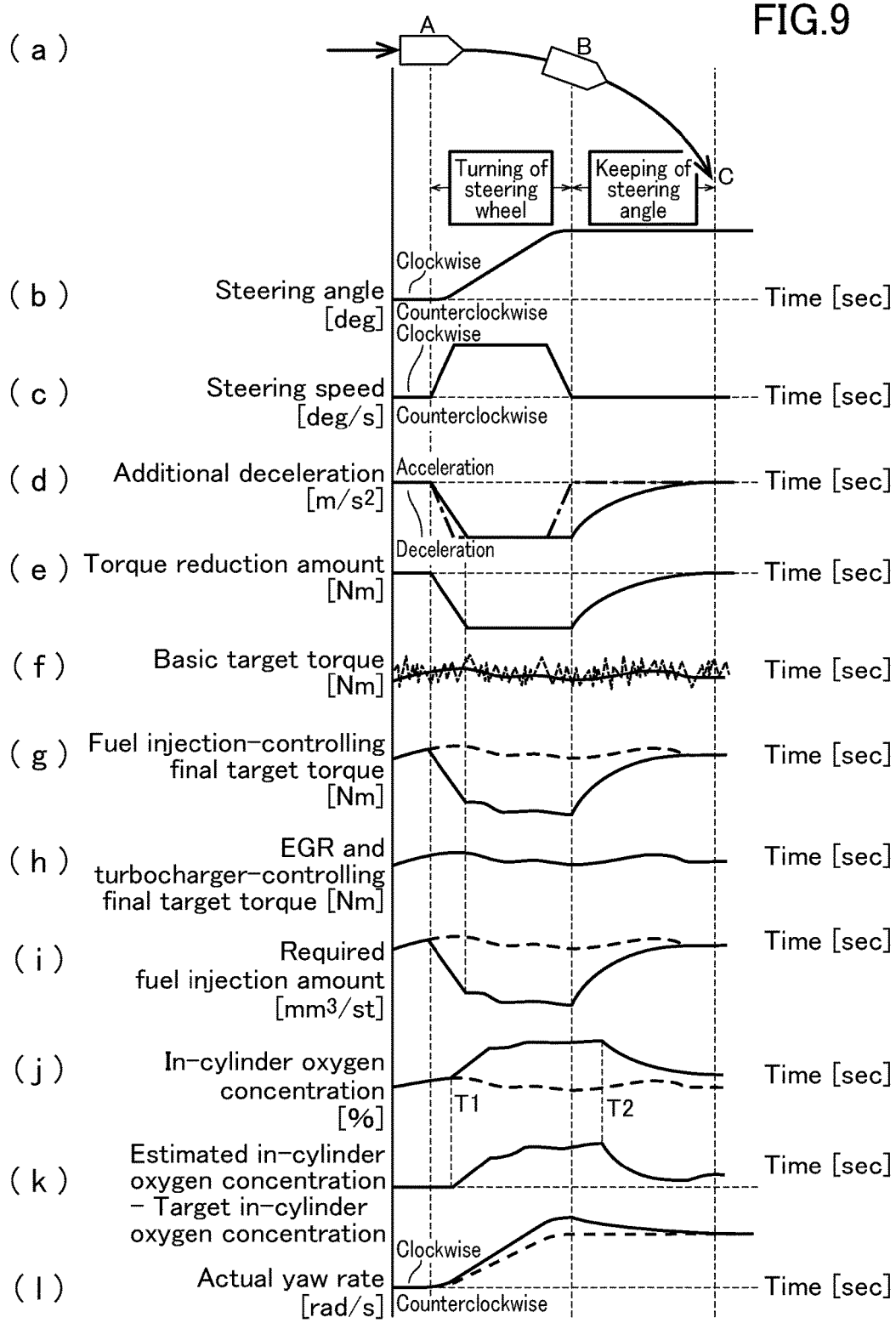

ENGINE CONTROL DEVICE

TECHNICAL FIELD

The present invention relates to an engine control device, and more particularly to a control device for an engine (internal combustion engine) whose combustion mode is switchable according to an engine operation state.

BACKGROUND ART

Heretofore, there has been known a control device capable of, in a situation where the behavior of a vehicle becomes unstable due to road wheel slip or the like, controlling the vehicle behavior to enable a safe traveling (e.g., an antiskid brake device). Specifically, there has been known a control device operable to detect the occurrence of vehicle understeer or oversteer behavior during vehicle cornering or the like, and apply an appropriate degree of deceleration to one or more road wheels so as to suppress such behavior.

There has also been known a vehicle motion control device operable to adjust a degree of deceleration during vehicle cornering to thereby adjust a load to be applied to front road wheels as steerable road wheels so as to enable a series of manipulations (braking, turning of a steering wheel, accelerating, turning-back of the steering wheel, etc.) by a driver during vehicle cornering under a normal traveling condition to be performed naturally and stably, differently from the aforementioned control for improving safety in a traveling condition causing the vehicle behavior to become unstable (see, for example, the following Patent Document 1).

Further, there has been proposed a vehicle behavior control device operable to reduce a vehicle driving force according to a yaw rate-related quantity (e.g., yaw acceleration) corresponding to steering wheel manipulation by a driver, thereby making it possible to quickly generate vehicle deceleration in response to start of the steering wheel manipulation by the driver and thus quickly apply a sufficient load to front road wheels as steerable road wheels (see, for example, the following Patent Document 2). In this vehicle behavior control device, in response to start of the steering wheel manipulation, a load is quickly applied to the front road wheels to cause an increase in frictional force between each of the front road wheels and a road surface and thus an increase in cornering force of the front road wheels, thereby providing an improved turn-in ability of a vehicle in an initial phase after entering a curve, and an improved responsivity with respect to turning manipulation of a steering wheel. This makes it possible to realize vehicle behavior just as intended by the driver.

CITATION LIST

[Patent Document]
  Patent Document 1: JP 2011-88576A
  Patent Document 2: JP 2014-166014A

SUMMARY OF INVENTION

Technical Problem

In the field of internal combustion engines such as a gasoline engine and a diesel engine, there has been known one type of engine whose combustion mode is switchable according to an engine operation state. For example, in the field of diesel engines, there has been known one type of diesel engine whose combustion mode is switchable between a diffusion combustion mode in which fuel is combusted while being injected into a cylinder, and a premixed combustion mode in which fuel is ignited after being preliminarily mixed with air in a cylinder.

Assume that, in a control device for such an engine, a current target torque is instantaneously reduced by the vehicle behavior control device described in the Patent Document 2, so as to generate vehicle deceleration according to manipulation of a steering wheel by a driver. In this case, the combustion mode of the engine can be switched from the diffusion combustion mode to the premixed combustion mode, in response to the change in the target torque. During the diffusion combustion in which fuel is combusted while being injected into a cylinder, with a view to suppressing degradation of emission quality due to incomplete combustion, an oxygen concentration in a cylinder (in-cylinder oxygen concentration) is set to a relatively high value, as compared to during the premixed combustion. Thus, when the combustion mode is switched from the diffusion combustion to the premixed combustion, the in-cylinder oxygen concentration needs to be reduced.

Specifically, when a fuel injection amount is reduced so as to instantaneously reduce the target torque, the in-cylinder oxygen concentration needs to be reduced according to the reduction in the fuel injection amount. However, control of the in-cylinder oxygen concentration cannot catch up with the reduction in the fuel injection amount, causing a relative increase in the in-cylinder oxygen concentration. As a result, an actual in-cylinder oxygen concentration becomes higher than a suitable in-cylinder oxygen concentration for the premixed combustion, and resulting abnormal combustion such as premature ignition undesirably causes generation of knock noise.

The present invention has been made to solve the above conventional problem, and an object thereof is to provide a control device for an engine whose combustion mode is switchable according to an engine operation state, wherein the control device is capable of controlling the engine to accurately realize vehicle behavior intended by a driver, while suppressing generation of knock noise due to abnormal combustion.

Solution to Technical Problem

In order to achieve the above object, the present invention provides a control device for an engine comprising an engine whose combustion mode is switchable according to an engine operation state. The engine control device comprises: a basic target torque-determining part configured to determine a basic target torque based on a driving state of a vehicle including manipulation of an accelerator pedal; a torque reduction amount-determining part configured to determine a torque reduction amount based on a driving state of the vehicle other than the manipulation of the accelerator pedal; a final target torque-determining part configured to determine a final target torque based on the basic target torque and the torque reduction amount; and an engine control part configured to control the engine to output the final target torque, wherein the engine control part configured, when the engine operation state is in a predetermined premixed combustion region, to set the combustion mode of the engine to a premixed combustion mode, and, when the engine operation state is in a predetermined diffusion combustion region, to set the combustion mode of the engine to a diffusion combustion mode, and wherein the engine control part is configured, when the engine operation state changes from the diffusion combustion region to the premixed combustion region, due to a change in the final target torque corresponding to a change in the torque reduction amount, to maintain the combustion mode of the engine in the diffusion combustion mode.

In the control device of the present invention having the above feature, the engine control part is configured to control the engine to output the final target torque reflecting the torque reduction amount determined based on the vehicle driving state other than the manipulation of the acceleration pedal, so that it is possible to control the engine to obtain the torque reduction amount with high responsivity with respect to the vehicle driving state other than the manipulation of the accelerator pedal, to thereby quickly apply a load to front road wheels. This makes it possible to control the engine to accurately realize vehicle behavior intended by a driver.

Further, the engine control part is configured, when the engine operation state changes from the diffusion combustion region to the premixed combustion region, due to a change in the final target torque corresponding to a change in the torque reduction amount, to maintain the combustion mode of the engine in the diffusion combustion mode, so that it is possible to avoid the need to reduce an in-cylinder oxygen concentration in response to switching of the combustion mode from the diffusion combustion mode to the premixed combustion mode, and thus suppress an increase in difference between an actual in-cylinder oxygen concentration and a suitable in-cylinder oxygen concentration for the combustion mode. This makes it possible to suppress generation of knock noise due to abnormal combustion such as premature ignition.

Preferably, in the control device of the present invention, the torque reduction amount-determining part is configured to determine the torque reduction amount according to manipulation of a steering wheel of the vehicle.

According to this feature, a temporal change in the torque reduction amount determined based on the manipulation of the steering wheel can be reflected on a temporal change in the final target torque, so that it is possible to quickly add, to the vehicle, deceleration according to the manipulation of the steering wheel by a driver to thereby apply a load to front road wheels to quickly increase a cornering force, thereby improving responsivity with respect to the manipulation of the steering wheel. This makes it possible to control the engine to accurately realize vehicle behavior intended by the driver, while suppressing generation of knock noise due to abnormal combustion such as premature ignition.

Preferably, in the control device of the present invention, the engine control part is configured, when the engine operation state changes from the premixed combustion region to the diffusion combustion region, due to a change in the final target torque corresponding to a change in the torque reduction amount, to switch the combustion mode of the engine from the premixed combustion mode to the diffusion combustion mode.

According to this feature, when the in-cylinder oxygen concentration rises according to a reduction in the final target torque corresponding to a change in the torque reduction amount, the suitable in-cylinder oxygen concentration for the combustion mode also rises in response to the switching of the combustion mode from the premixed combustion mode to the diffusion combustion mode, so that it is possible to suppress an increase in difference between an actual in-cylinder oxygen concentration and the suitable in-cylinder oxygen concentration for the combustion mode, and thus appropriately set the combustion mode according to the engine operation state, while suppressing generation of knock noise due to abnormal combustion such as premature ignition. This makes it possible to achieve enhanced combustion stability and improved emission quality.

In the control device of the present invention, when the engine is a diesel engine comprising a fuel injector for injecting fuel into a cylinder, the engine control part is preferably configured to control the fuel injector to regulate a fuel injection amount so as to enable the diesel engine to output the final target torque.

According to this feature, by changing the fuel injection amount of the diesel engine according to a final target torque reflecting the torque reduction amount, it becomes possible to accurately realize a temporal change in the torque reduction amount determined based on the vehicle driving state other than the manipulation of the accelerator pedal, with high responsivity. This makes it possible to control the diesel engine to accurately realize vehicle behavior intended by a driver.

Effect of Invention

The control device of the present invention can control the engine whose combustion mode is switchable according to an engine operation state, so as to accurately realize vehicle behavior intended by a driver, while suppressing generation of knock noise due to abnormal combustion.

BRIEF DESCRIPTION OF DRAWINGS

FIG. 8 is a map presenting a relationship of a difference between an estimated in-cylinder oxygen concentration and a target in-cylinder oxygen concentration, and a fuel injection parameter correction value.

FIG. 9 presents a temporal change in each parameter regarding engine control to be performed by the engine control device according to this embodiment during turning of a vehicle equipped with this engine control device, wherein: chart (a) is a top plan view schematically depicting the vehicle which is turning in a clockwise direction; chart (b) is a time chart presenting a change in steering angle of the vehicle which is turning in the clockwise direction as depicted in chart (a); chart (c) a time chart presenting a change in steering speed of the vehicle which is turning in the clockwise direction as depicted in chart (a); chart (d) is a time chart presenting a change in additional deceleration determined based on the steering speed presented in chart (c); chart (e) is a time chart presenting a change in torque reduction amount determined based on the additional deceleration presented in chart (d); chart (f) is a time chart presenting changes in basic target torque before and after being smoothed by a torque variation filter; chart (g) is a time chart presenting a change in fuel injection-controlling final target torque determined based on the basic target torque and the torque reduction amount; chart (h) is a time chart presenting a change in EGR and turbocharger-controlling final target torque determined based on the basic target torque; chart (i) is a time chart presenting a change in required fuel injection amount determined based on the fuel injection-controlling final target torque; chart (j) is a time chart presenting a change in target in-cylinder oxygen concentration and a change in actual in-cylinder oxygen concentration, in the case where a fuel injection amount is controlled as presented in chart (i); chart (k) is a time chart presenting a change in the difference between an actual in-cylinder oxygen concentration and the target in-cylinder oxygen concentration; and chart (1) is a time chart presenting a change in yaw rate (actual yaw rate) generated in the vehicle when the control of the fuel injection amount is performed as presented in chart (i), and a change in actual yaw rate generated in the vehicle when the control of the fuel injection amount based on the torque reduction amount determined by a torque reduction amount-determining part is not performed.

DESCRIPTION OF EMBODIMENTS

Figure 1:
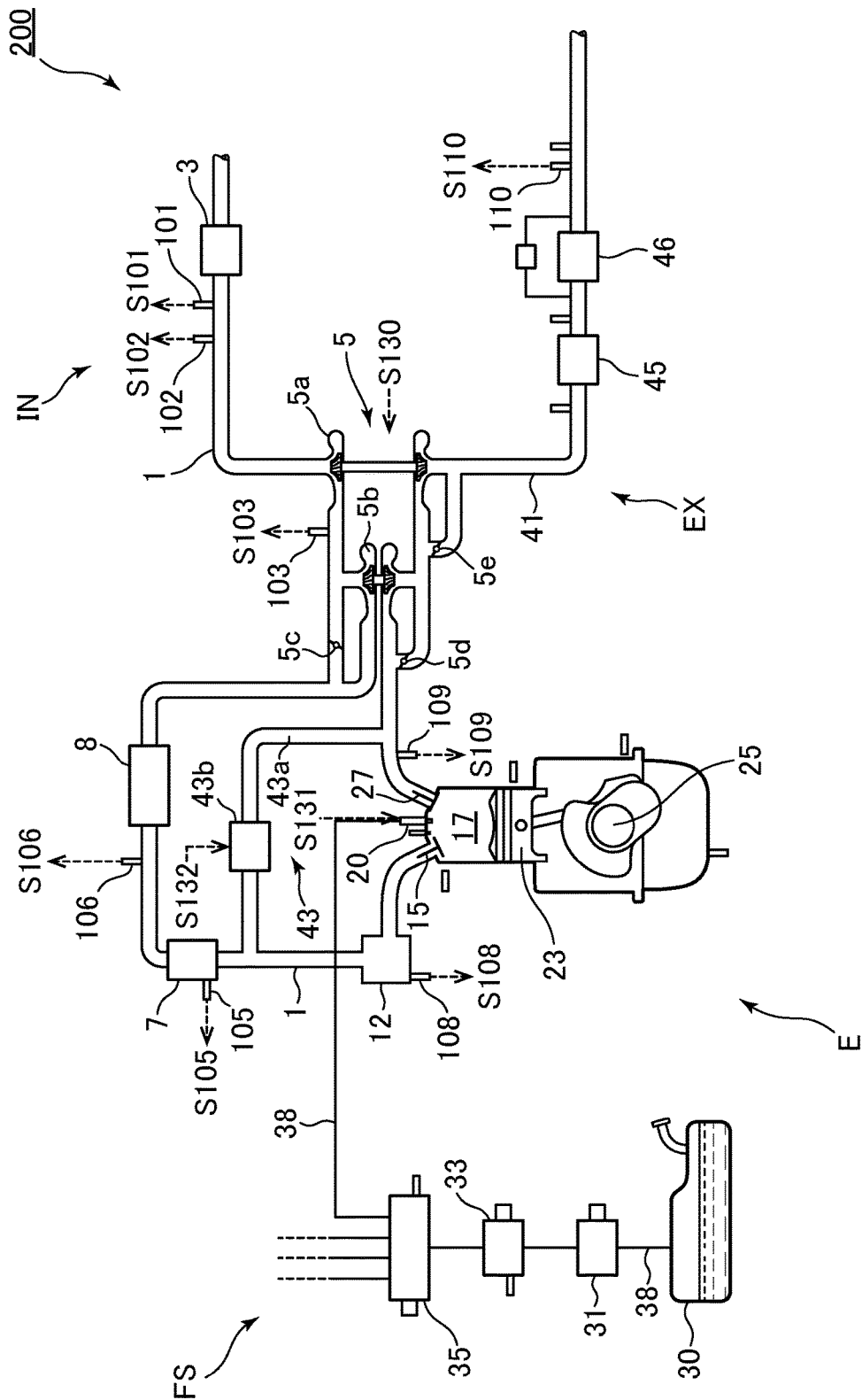
FIG. 1 is a schematic diagram depicting a configuration of an engine system employing an engine control device according to one embodiment of the present invention.

With reference to the accompanying drawings, an engine control device of the present invention will now be described based on an embodiment thereof.
<System Configuration>
First of all, an engine system employing an engine control device according to one embodiment of the present invention will be described with reference to FIG. 1. FIG. 1 is a schematic diagram depicting a configuration of the engine system employing the engine control device according to this embodiment.

As depicted in FIG. 1, the engine system 200 primarily comprises: an engine (internal combustion engine) E designed as a diesel engine; an intake system IN for supplying intake air to the engine E; a fuel supply system FS for supplying fuel to the engine E; an exhaust system EX for discharging exhaust gas from the engine E; aftermentioned various sensors 96 to 110 for detecting various states pertaining to the engine system 200; and a power-train control module (PCM) 60 for controlling the engine system 200.

First, the intake system IN comprises an intake passage 1 for allowing intake air to pass therethrough. The intake passage 1 is provided with: an air cleaner 3 for cleaning intake air introduced from outside; a compressor constituting a turbocharger 5 and configured to compress intake air passing therethrough to cause a rise in intake pressure; an intercooler 8 for cooling intake air by external air or cooling water; an intake shutter valve 7 for regulating a flow volume of intake air passing therethrough; and a surge tank 12 for temporarily storing intake air to be supplied to the engine E, which are arranged in this order from the side of an upstream end of the intake passage 1.

Further, in the intake system IN, the intake passage 1 is provided with: an airflow sensor 101 for detecting an intake air amount at a position immediately downstream of the air cleaner 3; an intake air temperature sensor 102 for detecting an intake air temperature at the position immediately downstream of the air cleaner 3; an intake air pressure sensor 103 for detecting an intake air pressure inside the turbocharger 5; and an intake air temperature sensor 106 for detecting the intake air temperature at a position immediately downstream of the intercooler 8. Further, the intake shutter value 7 is provided with an intake shutter valve position sensor 105 for detecting an opening degree of the intake shutter valve 7, and the surge tank 12 is provided with an intake air pressure sensor 108 for detecting the intake air pressure in an intake manifold. These various sensors 101 to 108 provided in the intake system IN are operable to output, to the PCM 60, detection signals S101 to S108 corresponding to respective ones of the detected parameter values.

Second, the engine E is provided with: an intake valve 15 for selectively introducing intake air supplied from the intake passage 1 (specifically, the intake manifold) into a combustion chamber 17 thereof; a fuel injector 20 for injecting fuel toward the combustion chamber 17; a piston 23 reciprocatingly movable according to combustion of an air-fuel mixture in the combustion chamber 17; a crankshaft 25 configured to be rotated according to the reciprocating movement of the piston 23; and an exhaust valve 27 for selectively discharging, to an aftermentioned exhaust passage 41, exhaust gas produced by the combustion of the air-fuel mixture in the combustion chamber 17.

Third, the fuel supply system FS comprises a fuel tank 30 for storing fuel therein, and a fuel supply passage 38 for supplying the fuel from the fuel tank 30 to the fuel injector 20. The fuel supply passage 38 is provided with a low-pressure fuel pump 31, a high-pressure fuel pump 33, and a fuel injection common rail 35, which are arranged in this order from an upstream end of the fuel supply passage 38.

Fourth, the exhaust system EX comprises an exhaust passage 41 for allowing exhaust gas to pass therethrough. The exhaust passage 41 is provided with: a turbine constituting the turbocharger 5 and configured to be rotated by exhaust gas passing therethrough, so as to rotationally drive the compressor in the aforementioned manner; and a diesel oxidation catalyst (DOC) 45 and a diesel particulate filter (DPF) 46 having an exhaust gas purification function, which are arranged in this order from the side of an upstream end of the exhaust passage 41. The DOC 45 is a catalyst capable of oxidizing hydrocarbon (HC) and carbon monoxide (CO) by using oxygen contained in exhaust gas to thereby convert them into water and carbon dioxide, and the DPF 46 is a filter capable of capturing particulate matter (PM) contained in exhaust gas.

Further, in the exhaust system EX, the exhaust passage 41 is provided with: an exhaust gas pressure sensor 109 for detecting an exhaust gas pressure at a position upstream of the turbine of the turbocharger 5; and a linear $O_2$ sensor 110 for detecting an oxygen concentration at a position immediately downstream of the DPF 46. These sensors 109, 110 provided in the exhaust system EX are operable to output, to the PCM 60, detection signals S109, S110 corresponding to respective ones of the detected parameter values.

Further, in this embodiment, the turbocharger 5 is constructed as a two-stage supercharging system capable of efficiently obtaining high supercharging in the entire engine speed range from a low engine speed range having relatively low exhaust energy to a high engine speed range. More specifically, the turbocharger 5 comprises: a large turbocharger 5a for supercharging a large amount of air in the high engine speed range; and a small turbocharger 5b capable of efficiently performing supercharging even under relatively low exhaust energy; a compressor bypass valve 5c for controlling a flow of intake air to a compressor of the small turbocharger 5b; a regulator valve 5d for controlling a flow of exhaust gas to a turbine of the small turbocharger 5b; and a waste gate valve 5e for controlling a flow of exhaust gas to a turbine of the large turbocharger 5a. These valves are configured to be driven according to an operation state of the engine E (engine speed and engine load), so as to switch among a plurality of supercharging modes using the large turbocharger 5a and the small turbocharger 5b.

The engine system 200 in this embodiment further comprises an EGR device 43. The EGR device 43 comprises: an EGR passage 43a connecting an area of the exhaust passage 42 upstream of the turbine of the turbocharger 5 to an area of the intake passage 1 downstream of the compressor of the turbocharger 5 (specifically, downstream of the intercooler 8); and an EGR valve 43b for adjusting a flow volume of exhaust gas to be allowed to pass through the EGR passage 43a.

An amount of exhaust gas to be recirculated to the intake system IN by the EGR device 43 (hereinafter referred to as "EGR gas amount") is roughly determined by the exhaust gas pressure at a position upstream of the turbine of the turbocharger 5, the intake air pressure produced by the opening degree of the intake shutter valve 7, and an opening degree of the EGR valve 43b.

Figure 2:
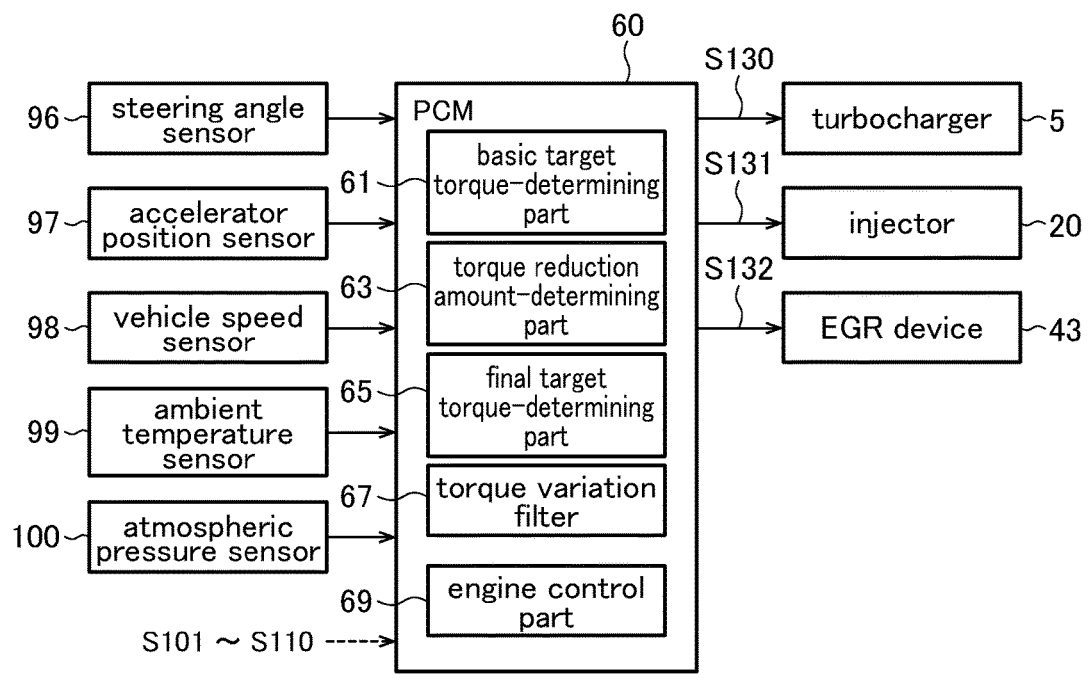
FIG. 2 is a block diagram depicting an electrical configuration of the engine control device according to this embodiment.

Next, with reference to FIG. 2, an electrical configuration of the engine control device according to this embodiment will be described. FIG. 2 is a block diagram depicting the electrical configuration of the engine control device according to this embodiment.

The PCM 60 (engine control device) according to this embodiment is operable to output control signals S130 to S132 to perform respective controls for turbocharger 5, the fuel injector 20 and the EGR device 43, based on detection signals S96 to S100 output, respectively, from: a steering angle sensor 96 for detecting a rotational angle of a steering wheel of a vehicle mounting the engine system 200 (steering angle); an accelerator position sensor 97 for detecting an angular position of an accelerator pedal (accelerator position); a vehicle speed sensor 98 for detecting a vehicle speed; an ambient temperature sensor 99 for detecting an ambient temperature; and an atmospheric pressure sensor 100 for detecting atmospheric pressure, in addition to the detection signals S101 to S110 from the aforementioned various sensors 101 to 110.

The PCM 60 comprises: a basic target torque-determining part 61 configured to determine a basic target torque based on a driving state of the vehicle including manipulation of the accelerator pedal; a torque reduction amount-determining part 63 configured to determine a torque reduction amount based on a driving state of the vehicle other than the manipulation of the accelerator pedal; a final target torque-determining part 65 configured to determine a final target torque based on the basic target torque and the torque reduction amount; a torque variation filter 67 configured to smooth a temporal variation of the final target torque; and an engine control part 69 configured to control the engine E to output the final target torque.

The above parts of the PCM 60 are realized by a computer which comprises: a CPU; various programs (including a basic control program such as an OS, and an application program capable of being activated on the OS to realize a specific function) to be interpreted and executed by the CPU; and an internal memory such as ROM or RAM storing therein the programs and a variety of data.

Next, with reference to FIGS. 3 to 8, processing to be performed by the engine control device will be described.

Figure 3:
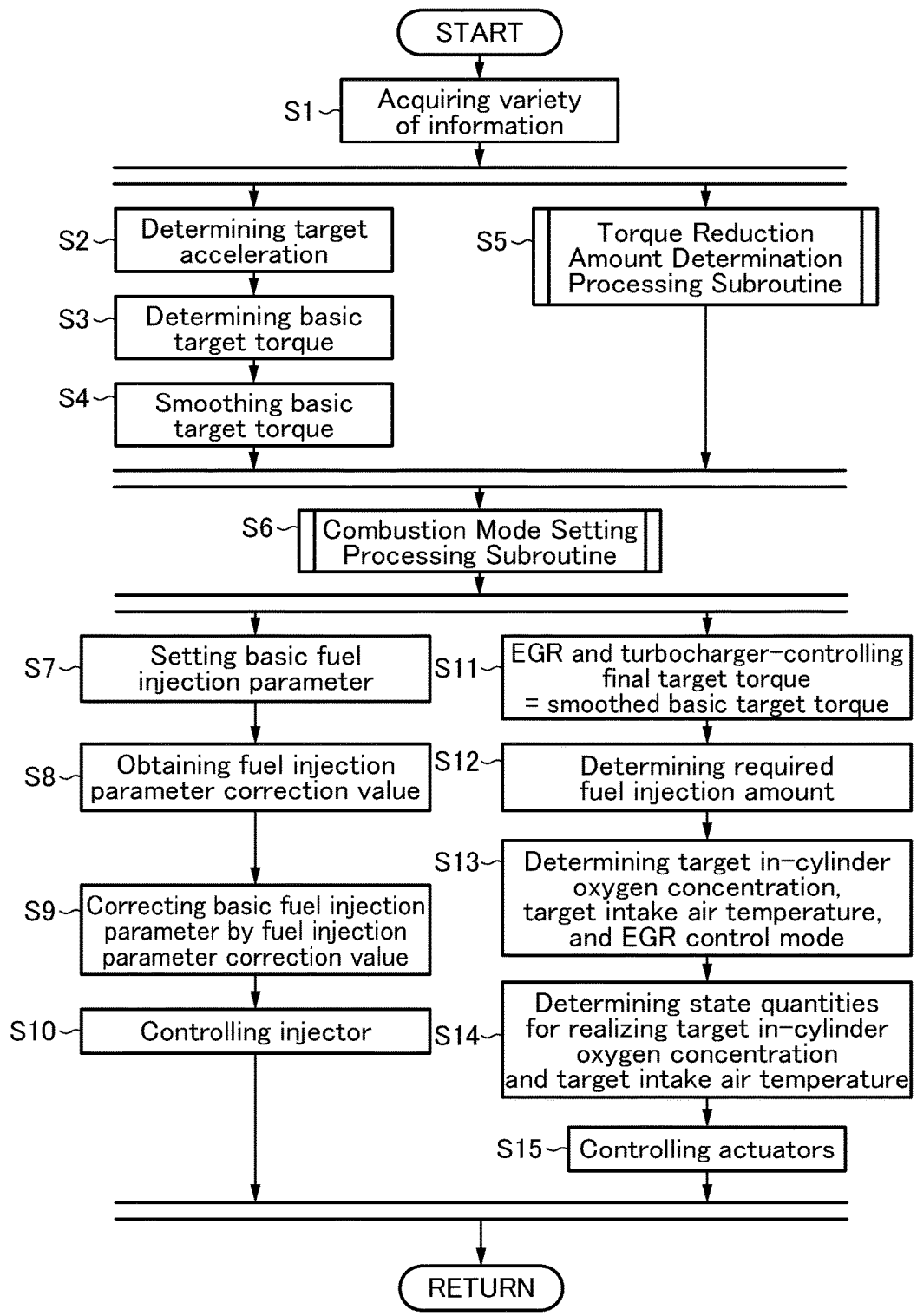
FIG. 3 is a flowchart of an engine control processing routine to be executed by the engine control device according to this embodiment, so as to control the engine.
Figure 4:
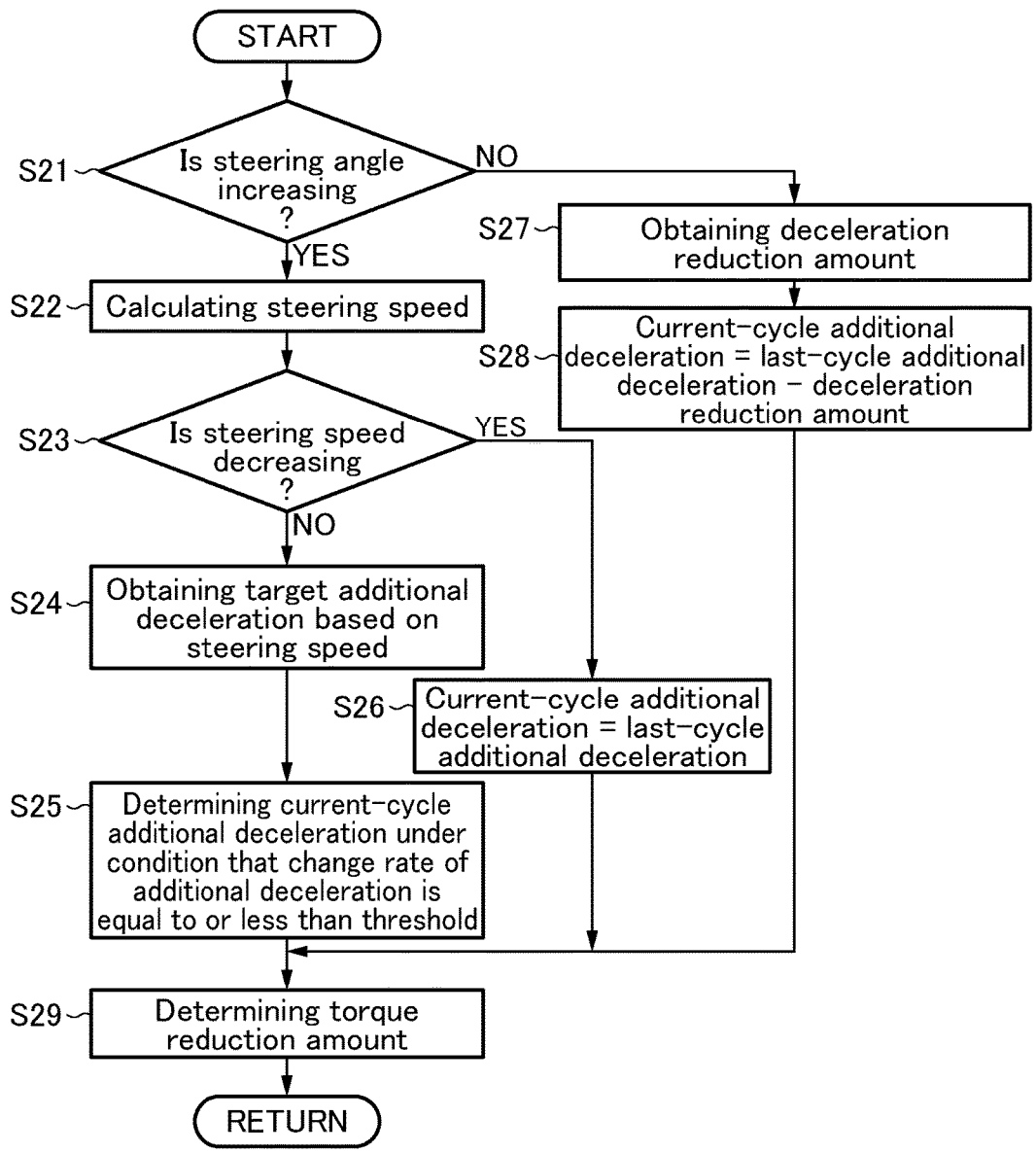
FIG. 4 is a flowchart of a torque reduction amount determination processing subroutine to be executed by the engine control device according to this embodiment, so as to determine a torque reduction amount.
Figure 5:
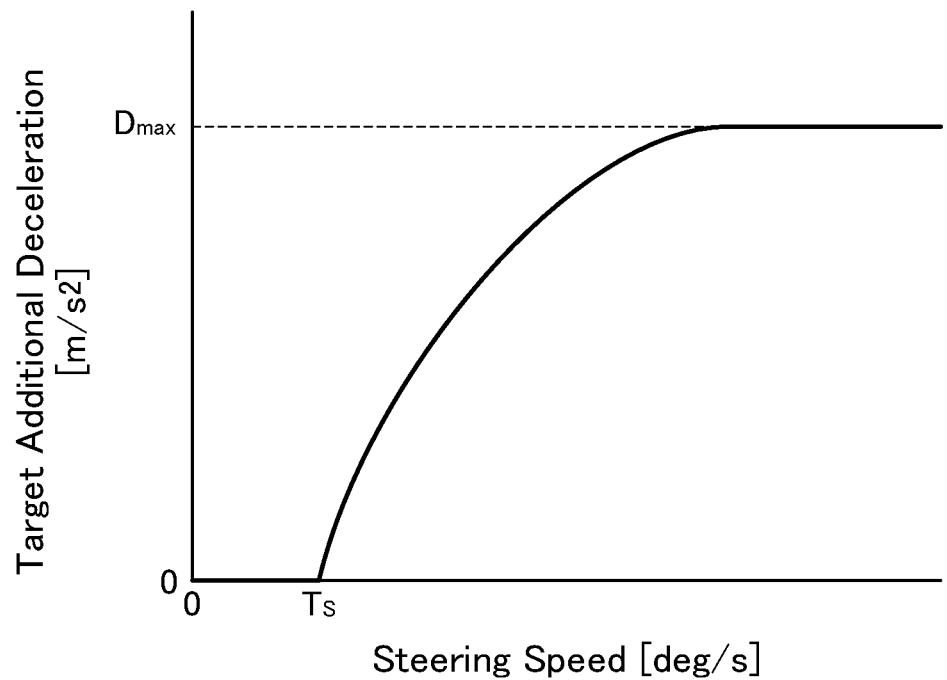
FIG. 5 is a map presenting a relationship between steering speed, and target additional deceleration to be determined by the engine control device according to this embodiment.
Figure 6:
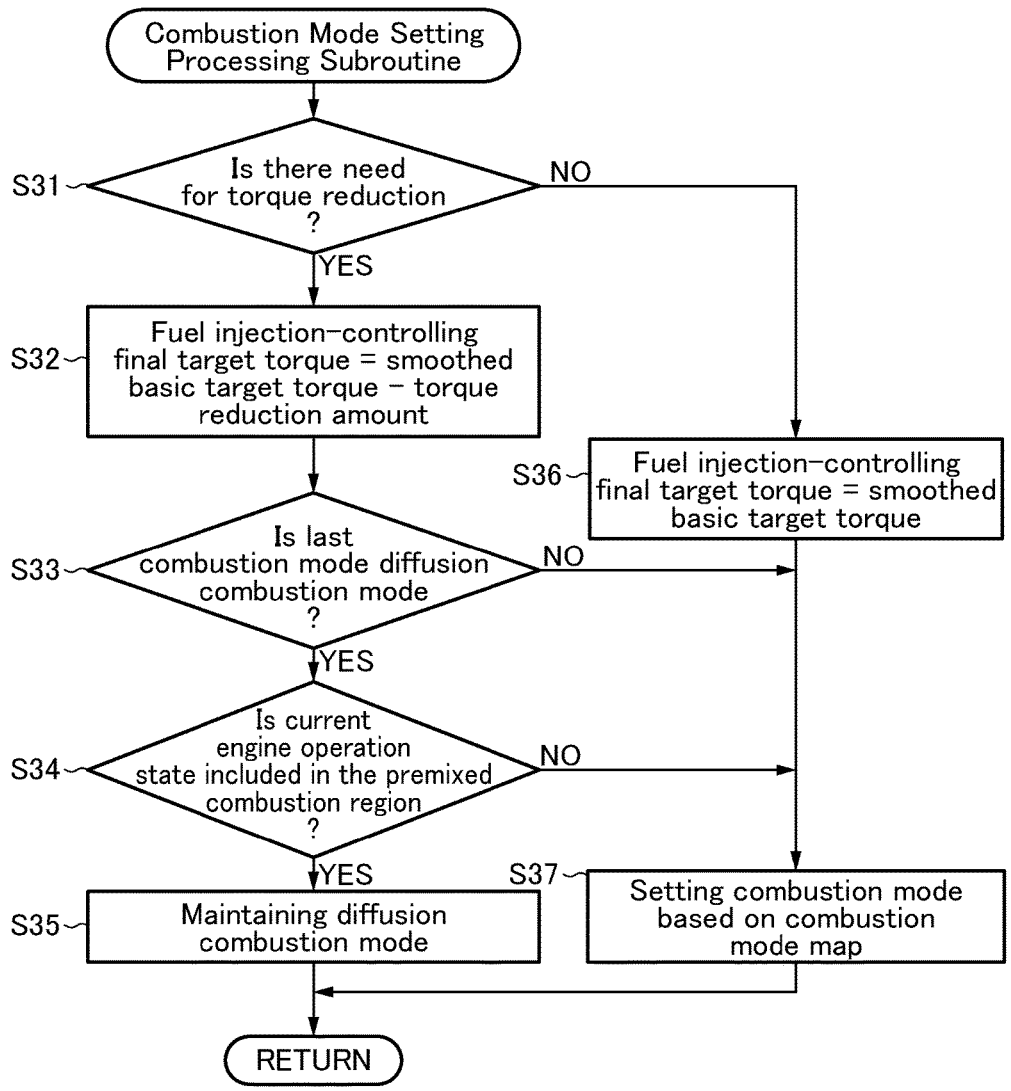
FIG. 6 is a flowchart of a combustion mode determination processing subroutine to be executed by the engine control device according to this embodiment, so as to determine a combustion mode.
Figure 7:
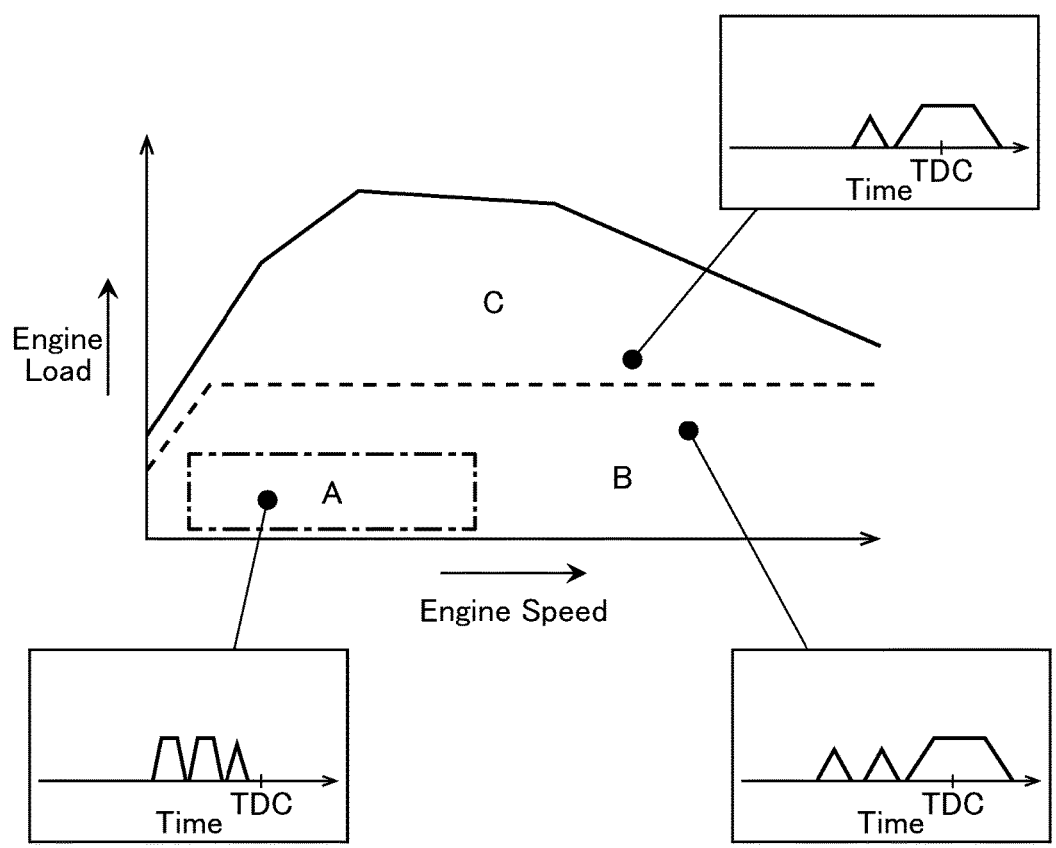
FIG. 7 is a map conceptually presenting engine operation regions to be used by the engine control device according to this embodiment, as criteria for switching between combustion modes.

FIG. 3 is a flowchart of an engine control processing routine to be executed by the engine control device according to this embodiment, so as to control the engine E, and FIG. 4 is a flowchart of a torque reduction amount determination processing subroutine to be executed by the engine control device according to this embodiment, so as to determine the torque reduction amount. FIG. 5 is a map presenting a relationship between steering speed, and target additional deceleration to be determined by the engine control device according to this embodiment. FIG. 6 is a flowchart of a combustion mode determination processing subroutine to be executed by the engine control device according to this embodiment, so as to determine a combustion mode. FIG. 7 is a map conceptually presenting engine operation regions to be used by the engine control device according to this embodiment, as criteria for switching between combustion modes. FIG. 8 is a map presenting a relationship of a difference between an estimated in-cylinder oxygen concentration and a target in-cylinder oxygen concentration, and a fuel injection parameter correction value.

The engine control processing routine in FIG. 3 is activated when an ignition switch of the vehicle is turned on to apply power to the engine control device, and repeatedly executed.

As depicted in FIG. 3, upon start of the engine control processing routine, in step S1, the PCM 60 operates to acquire information about a driving state of the vehicle. Specifically, the PCM 60 operates to acquire, as the driving state, detection signals S96 to S110 and the like output from the aforementioned various sensors 96 to 110, including the steering angle detected by the steering angle sensor 96, the accelerator position detected by the accelerator position sensor 97, the vehicle speed detected by the vehicle speed sensor 98, and a gear stage currently set in a transmission of the vehicle.

Subsequently, in step S2, the basic target torque-determining part of the PCM 60 operates to set a target acceleration based on the driving state of the vehicle including the manipulation of the accelerator pedal acquired in the step S1. Specifically, the basic target torque-determining part operates to select, from a plurality of acceleration characteristic maps defined with respect to various vehicle speeds and various transmission gear stages (the maps are created in advance and stored in a memory or the like), one acceleration characteristic map corresponding to a current vehicle speed and a current transmission gear stage, and determine, as the target acceleration, an acceleration corresponding to a current accelerator position, with reference to the selected acceleration characteristic map.

Subsequently, in step S3, the basic target torque-determining section 61 operates to determine the basic target torque of the engine E for realizing the target acceleration determined in the step S2. In this case, the basic target torque-determining part 61 operates to determine the basic target torque within a torque range which can be produced by the engine E, based on current vehicle speed, transmission gear stage, road grade, road surface mu ($\mu$), etc.

Subsequently, in step S4, the torque variation filter 67 operates to smooth a temporal variation of the basic target torque determined in the step S3. As a specific technique for the smoothing, it is possible to employ various known techniques (e.g., a technique of limiting a change rate of the basic target torque to a threshold or less, and a technique of calculating a moving average of the temporal variation of the basic target torque).

In parallel with the processings in the steps S2 and S4, in step S5, the torque reduction amount-determining part 63 operates to perform a torque reduction amount determination processing subroutine for determining the torque reduction amount based on the vehicle driving state other than the manipulation of the steering wheel. This torque reduction amount determination processing subroutine will be described with reference to FIG. 4.

As depicted in FIG. 4, upon start of the torque reduction amount determination processing subroutine, in step S21, the torque reduction amount-determining part 63 operates to determine whether or not an absolute value of the steering angle acquired in the step S1 is increasing. As a result, when the absolute value of the steering angle is increasing, the subroutine proceeds to step S22. In the step S22, the torque reduction amount-determining part 63 operates to calculate a steering speed based on the steering angle acquired in the step S1.

Subsequently, in step S23, the torque reduction amount-determining part 63 operates to determine whether or not an absolute value of the steering speed is decreasing.

As a result, when the absolute value of the steering speed is not decreasing, i.e., the absolute value of the steering speed is increasing or the absolute value of the steering speed does not change, the subroutine proceeds to step S24. In the step S24, the torque reduction amount-determining part 63 operates to obtain a target additional deceleration based on the calculated steering speed. This target additional deceleration is a deceleration to be added to the vehicle according to the manipulation of the steering wheel, so as to accurately realize vehicle behavior intended by a driver.

Specifically, the torque reduction amount-determining part 63 operates to obtain a value of the target additional deceleration corresponding to the steering speed calculated in the step S22, based on a relationship between the target additional deceleration and the steering speed, indicated by the map in FIG. 5.

In FIG. 5, the horizontal axis represents the steering speed, and the vertical axis represents the target additional deceleration. As depicted in FIG. 5, when the steering speed is less than a threshold $T_S$ (e.g., 10 deg/s), a corresponding value of the target additional deceleration is 0. That is, when the steering speed is less than the threshold $T_S$, the control of adding deceleration to the vehicle according to the manipulation of the steering wheel is not performed.

On the other hand, when the steering speed is equal to or greater than the threshold $T_S$, a value of the target additional deceleration corresponding to this steering speed comes closer to a given upper limit value $D_{max}$ (e.g., 1 m/s$^2$). That is, as the steering speed becomes larger, the target additional deceleration becomes larger, and an increase rate of the target additional deceleration becomes smaller.

Subsequently, in the step S25, the torque reduction amount-determining part 63 operates to determine an additional deceleration in the current processing cycle (current-cycle additional deceleration), under the condition that the increase rate of the additional deceleration is equal to or less than a threshold $R_{max}$ (e.g., 0.5 m/s$^3$).

Specifically, the torque reduction amount-determining part 63 operates to, when an increase rate from the additional deceleration determined in the last processing cycle (last-cycle additional deceleration) to the target additional deceleration obtained in the step S24 in the current cycle is equal to or less than the threshold $R_{max}$, determine the target additional deceleration obtained in the step S24, as the current-cycle additional deceleration.

On the other hand, the torque reduction amount-determining part 63 operates to, when the increase rate from the last-cycle additional deceleration to the target deceleration obtained in the step S24 in the current processing cycle is greater than the threshold $R_{max}$, determine, as the current-cycle additional deceleration, a value obtained by increasing the last-cycle additional deceleration at the increase rate $R_{max}$ for the given cycle period.

Referring to the step S23 again, when the absolute value of the steering speed is decreasing, the subroutine proceeds to step S26. In the step S26, the torque reduction amount-determining part 63 operates to determine the last-cycle additional deceleration as the current-cycle additional deceleration. That is, when the absolute value of the steering speed is decreasing, an additional deceleration corresponding to a maximum value of the steering speed (i.e., a maximum value of the additional deceleration) is maintained.

Referring to the step S21 again, when the absolute value of the steering angle is not increasing (i.e., is maintained constant or is decreasing), the subroutine proceeds to step S27. In the step S27, the torque reduction amount-determining part 63 operates to obtain an amount (deceleration reduction amount) by which the last-cycle additional deceleration is to be reduced in the current processing cycle. For example, the deceleration reduction amount may be calculated based on a constant reduction rate (e.g., 0.3 m/s$^3$) preliminarily stored in a memory or the like. Alternatively, the deceleration reduction amount may be calculated based on a reduction rate determined according to the vehicle driving state acquired in the step S1 and/or the steering speed calculated in Step S22.

Subsequently, in step S28, the torque reduction amount-determining part 63 operates to determine the current-cycle additional deceleration by subtracting the deceleration reduction amount obtained in the step S27 from the last-cycle additional deceleration.

After completion of the step S25, S26 or S28, in step S29, the torque reduction amount-determining part 63 operates to determine the torque reduction amount, based on the current-cycle additional deceleration determined in the step S25, S26 or S28. Specifically, the torque reduction amount-determining part 63 operates to determine a value of the torque reduction amount required for realizing the current-cycle additional deceleration, based on the current vehicle speed, transmission gear stage, road grade and others acquired in the Step S1. After completion of the step S29, the torque reduction amount-determining part 63 operates to terminate the torque reduction amount determination processing subroutine, and the subroutine returns to the main routine.

Returning to FIG. 3 again, after completion of the processings in the steps S2 to S4 and the torque reduction amount determination processing subroutine in the step S5, in step S6, the engine control part 69 operates to execute a combustion mode setting processing subroutine for setting the combustion mode of the engine E according to the operation state of the engine E. This combustion mode setting processing subroutine will be described with reference to FIG. 6.

As depicted in FIG. 6, upon start of the combustion mode setting processing subroutine, in step S31, the engine control part 69 operates to determine where or not there is a need for torque reduction based on the vehicle driving state other than the manipulation of the accelerator pedal. Specifically, when the torque reduction amount determined in the torque reduction amount determination processing subroutine in the step S5 is greater than 0, the engine control part 69 operates to determine that there is the need for the torque reduction.

As a result, when there is the need for the torque reduction, the subroutine proceeds to step S32. In the step S32, the final target torque-determining part 65 operates to subtract the torque reduction amount determined in the torque reduction amount determination processing subroutine in the step S5 from the basic target torque after being smoothed in the step S4, to thereby determine a fuel injection-controlling final target torque for controlling the fuel injector 20.

Subsequently, in step S33, the engine control part 69 operates to determine whether or not the combustion mode of the engine E in the last combustion cycle is a diffusion combustion mode.

As a result, when the combustion mode of the engine E in the last combustion cycle is the diffusion combustion mode, the subroutine proceeds to step S34. In the step S34, the engine control part 69 operates to determine whether or not the engine operation state (specifically, the fuel injection-controlling final target torque and the engine speed of the engine E) in a current combustion cycle is included in a premixed combustion region.

Here, with reference to FIG. 7, a relationship between the engine operation state and the combustion mode will be described. In a combustion mode map in FIG. 7, the horizontal axis represents the engine speed, and the vertical axis represents the engine load (in this embodiment, the fuel injection-controlling final target torque). As depicted in FIG. 7, the premixed combustion region A is set in a range where the engine speed and the engine load are relatively low, and two diffusion combustion regions B, C are set in a range except the premixed combustion region.

That is, in the step S34, the engine control part 69 operates to determine whether or not the operation state of the engine E in the current combustion cycle is included in the low engine speed and low engine load, premixed combustion region (the region A in FIG. 7). As a result, when the operation state of the engine E in the current combustion cycle is included in the premixed combustion region, the subroutine proceeds to step S35. In the step S35, the engine control part 69 operates to maintain the last combustion mode (i.e., diffusion combustion mode) to serve as the current combustion mode, irrespective of the operation state of the engine E in the current combustion cycle.

Referring to the step S31 again, when there is no need for the torque reduction based on the vehicle driving state other than the manipulation of the accelerator pedal, the subroutine proceeds to step S36. In the step S36, the final target torque-determining part 65 operates to determine the basic target torque after being smoothed in the step S4, as the fuel injection-controlling final target torque.

Subsequently, in step S37, the engine control part 69 operates to set a combustion mode corresponding to the operation state of the engine E in the current combustion cycle, based on the combustion mode map exemplified in FIG. 7. Specifically, the engine control part 69 operates to set the combustion mode in the current combustion cycle to a premixed combustion mode, when the operation state of the engine E in the current combustion cycle is included in the premixed combustion region A, and set the combustion mode in the current combustion cycle to the diffusion combustion mode, when the operation state of the engine E in the current combustion cycle is included in the diffusion combustion region B or C.

Referring to the step S33 again, when the combustion mode of the engine E in the last combustion cycle is not the diffusion combustion mode (is the premixed combustion mode), the subroutine proceeds to the step S37. In the step S37, the engine control part 69 operates to set the combustion mode corresponding to the operation state of the engine E in the current combustion cycle, based on the combustion mode map exemplified in FIG. 7.

For example, when the combustion mode of the engine E in the last combustion cycle is the premixed combustion mode, and the operation state of the engine E in the current combustion cycle is included in the diffusion combustion region B or C, the engine control part 69 operates to switch the current combustion mode from the premixed combustion mode which is the last combustion mode, to the diffusion combustion mode.

Referring to the step S34 again, when the operation state of the engine E in the current combustion cycle is not included in the premixed combustion region (is included in the diffusion combustion region), the subroutine proceeds to the step S37. In the step S37, the engine control part 69 operates to set the combustion mode corresponding to the operation state of the engine E in the current combustion cycle, based on the combustion mode map exemplified in FIG. 7. Specifically, the engine control part 69 operates to set the combustion mode in the current combustion cycle to the diffusion combustion mode.

After completion of the processing in the step S35 or S37, the PCM 60 operates to terminate the combustion mode setting processing subroutine, and the subroutine returns to the main routine.

Returning to FIG. 3 again, after completion of the combustion mode setting processing subroutine in the step S6, in step S7, the engine control part 69 operates to set a basic fuel injection parameter for controlling the fuel injector 20. Examples of the basic fuel injection parameter include a required fuel injection amount, and the number of times of fuel injection, a fuel injection timing in each injection and a fuel injection amount in each injection, in the case of performing multistage fuel injection. The basic fuel injection parameter is preliminarily set in association with the engine operation state.

For example, as depicted in FIG. 7, in the premixed combustion region A, the basic fuel injection parameter is set such that a main injection divided into three partial injections is performed before top-dead-center of compression stroke. On the other hand, in the diffusion combustion region B which is one of the two diffusion combustion regions where the engine load is relatively low, the basic fuel injection parameter is set such that two pre-stage injections (pilot injection(s) and/or pre-injection(s)) and one main injection are performed before and after top-dead-center of compression stroke. In the diffusion combustion region C which is the other diffusion combustion region where the engine load is relatively high, the basic fuel injection parameter is set such that one pre-stage injection and one main injection are performed before and after top-dead-center of compression stroke.

Subsequently, in step S8, the engine control part 69 operates to obtain a fuel injection parameter correction value for correcting the basic fuel injection parameter set in the step S7.

Specifically, when the combustion mode of the engine E is the diffusion combustion mode, the engine control part 69 operates to obtain a fuel injection parameter correction value for reducing the fuel injection amount in the pre-stage injection(s), upon a change in the fuel injection-controlling final target torque corresponding to a change in the torque reduction amount.

On the other hand, when the combustion mode of the engine E is the premixed combustion mode, the engine control part 69 operates to obtain a fuel injection parameter correction value for retarding the fuel injection timing in the main injection, upon a change in the fuel injection-controlling final target torque corresponding to a change in the torque reduction amount.

These fuel injection parameter correction values are set based on a difference between an oxygen concentration in a cylinder of the engine E (in-cylinder oxygen concentration), and a target in-cylinder oxygen concentration necessary for enabling the engine E to output the fuel injection-controlling final target torque. In this embodiment, the engine control part 69 operates to estimate the in-cylinder oxygen concentration by an intake and exhaust model in which an oxygen concentration of gas in intake and exhaust paths is modeled, using parameters such as intake charge amount, an intake air amount, and a flow rate and an oxygen concentration of EGR gas. In this case, the intake charge amount is calculated based on detection signals from the intake air pressure sensor 108 and an intake manifold temperature sensor. The intake air amount is specified by the detection sensor S101 from the airflow sensor 101. Further, the oxygen concentration of EGR gas is calculated based on detection signals S110 from the linear $O_2$ sensor 110, and a time lag before the linear $O_2$ sensor 110 can actually detect an oxygen concentration of exhaust gas.

Here, with reference to FIG. 8, a relationship of a difference between an estimated in-cylinder oxygen concentration and a target in-cylinder oxygen concentration, and the fuel injection parameter correction value. Chart (a) is a correction map to be used when the combustion mode of the engine E is the premixed combustion mode, and chart (b) is a correction map to be used when the combustion mode of the engine E is the diffusion combustion mode. In these correction maps, the horizontal axis represents a difference value obtained by subtracting the target in-cylinder oxygen concentration from the estimated in-cylinder oxygen concentration, and the vertical axis represents the fuel injection parameter correction value.

When the combustion mode of the engine E is the premixed combustion mode, a correction value of the fuel injection timing in the main injection is set such that it becomes larger toward a retard side, along with an increase in the difference between the estimated in-cylinder oxygen concentration and the target in-cylinder oxygen concentration, as presented in chart (a).

On the other hand, when the combustion mode of the engine E is the diffusion combustion mode, a correction value of the fuel injection amount in the pre-stage injection (s) is set such that it becomes larger toward a reduction side, along with an increase in the difference between the estimated in-cylinder oxygen concentration and the target in-cylinder oxygen concentration, as presented in chart (b).

Returning to FIG. 3 again, in step S9, the engine control part 69 operates to correct the basic fuel injection parameter set in the step S7 by the fuel injection parameter correction value obtained in the step S8. Specifically, when the combustion mode of the engine E is the premixed combustion mode, the engine control part 69 operates to gradually retard the fuel injection timing of the main injection along with an increase in the difference between the estimated in-cylinder oxygen concentration and the target in-cylinder oxygen concentration. On the other hand, when the combustion mode of the engine E is the diffusion combustion mode, the engine control part 69 operates to gradually reduce the fuel injection amount in the pre-stage injection(s) along with an increase in the difference between the estimated in-cylinder oxygen concentration and the target in-cylinder oxygen concentration.

Then, in step S10, the engine control part 69 operates to control the fuel injector 20 based on a fuel injection parameter corrected in the step S9

In parallel with the processings in the steps S7 to S10, in step S11, the final target torque-determining part 65 operates to determine the basic target torque after being smoothed in the step S4, as an EGR and turbocharger-controlling final target torque for controlling the turbocharger 5 and the EGR device 43.

Subsequently, in step S12, the engine control part 69 operates to set, based on the EGR and turbocharger-controlling final target torque set in the step S11, and the engine speed, a required fuel injection amount to be injected from the fuel injector 20 so as to enable the engine E to output the EGR and turbocharger-controlling final target torque.

Subsequently, in step S13, the engine control part 69 operates to set the target in-cylinder oxygen concentration, a target intake air temperature, and an EGR control mode (control mode for activating the EGR device 43, or control mode for deactivating the EGR device 43), based on the required fuel injection amount set in the step S12, and the engine speed.

Subsequently, in step S14, the engine control part 69 operates to set various state quantities for realizing the target in-cylinder oxygen concentration and the target intake air temperature set in the step S13. Examples of the state quantities include an amount of exhaust gas to be recirculated to the intake system IN by the EGR device 43 (EGR gas amount), and a supercharging pressure by the turbocharger 5.

Subsequently, in step S15, the engine control part 69 operates to control respective actuators for driving the components of the engine system 200, based on the state quantities set in the step S14.

In this embodiment, the engine control part 69 operates to feedforward-control the EGR device 43 to realize the state quantities set in the step S14, and feedback-control the EGR device 43 to cause actual in-cylinder state quantities (in-cylinder oxygen concentration and intake air temperature) to come close to the state quantities (i.e., the target in-cylinder oxygen concentration and the target intake air temperature) set in the step S13

Before performing the control, the engine control part 69 operates to set a limit value or range with respect to each of the state quantities, and set a control amount of each of the actuator to enable its related state value to preserve limitation by the limit value or range.

After completion of the steps S10 and S15, the PCM 60 operates to terminate the engine control processing routine.

Next, with reference to FIG. 9, an operation of the engine control device according to this embodiment will be described. FIG. 9 presents a temporal change in each parameter regarding engine control to be performed by the engine control device according to this embodiment during turning of a vehicle equipped with the engine control device.

Chart (a) is a top plan view schematically depicting the vehicle which is turning in a clockwise direction. As depicted in chart (a), the vehicle starts to turn from a position A, and continues to turn from a position B to a position C in the clockwise direction at a constant steering angle.

Chart (b) is a time chart presenting a change in the steering angle of the vehicle which is turning in the clockwise direction as depicted in chart (a). In chart (b), the horizontal axis represents time, and the vertical axis represents the steering angle.

As presented in chart (b), clockwise steering is started at the position A, and then, along with additional turning manipulation of the steering wheel, a clockwise steering angle gradually increases and reaches a maximum value at the position B. Subsequently, the steering angle is maintained constant until the vehicle reaches the position C (Keeping of the steering angle).

Chart (c) is a time chart presenting a change in the steering speed of the vehicle which is turning in the clockwise direction as depicted in chart (a). In chart (c), the horizontal axis represents time, and the vertical axis represents the steering speed.

The steering speed of the vehicle is expressed as a temporal differentiation of the steering angle of the vehicle. That is, as presented in chart (c), when clockwise steering is started at the position A, a clockwise steering speed arises and is maintained approximately constant in an intermediate zone between the position A and the position B. Then, when the clockwise steering speed decreases, and the clockwise steering angle reaches the maximum value at the position B, the steering speed becomes 0. Then, when the clockwise steering angle is maintained during traveling from the position B to the position C, the steering speed is kept at 0.

Chart (d) is a time chart presenting a change in the additional deceleration determined based on the steering speed presented in chart (c). In chart (d), the horizontal axis represents time, and the vertical axis represents the additional deceleration. In chart (d), the solid line indicates a change in the additional deceleration determined in the torque reduction amount determination processing subroutine in FIG. 4, and the one-dot chain line indicates a change in the target additional deceleration based on the steering speed. As with the change in the steering speed presented in chart (c), the target additional deceleration indicated by the one-dot chain line starts to increase from the position A, and is maintained approximately constant in the intermediate zone between the position A and the position B, whereafter it decreases and becomes 0 at the position B.

As described with reference to FIG. 4, when the absolute value of the steering speed is determined in the step S23 to be not decreasing, i.e., to be increasing or to have no change, the torque reduction amount-determining part 63 operates in the step S24 to obtain the target additional deceleration based on the steering speed. Subsequently, in the step S25, the torque reduction amount-determining part 63 operates to determine an additional deceleration in each processing cycle, under the condition that the increase rate of the additional deceleration is equal to or less than the threshold $R_{max}$.

Chart (d) presents an example in which the increase rate of the target additional deceleration starting to increase from the position A is greater than the threshold $R_{max}$. In this case, the torque reduction amount-determining part 63 operates to increase the additional deceleration at an increase rate equal to the upper limit $R_{max}$ (i.e., at an increase rate providing a gentler slope than that of the target additional deceleration indicated by the one-dot chain line). Then, when the target additional deceleration is maintained approximately constant in the intermediate zone between the position A and the position B, the torque reduction amount-determining part 63 operates to determine the additional deceleration such that it becomes equal to the target additional deceleration.

Then, when the absolute value of the steering speed is determined in the step S23 depicted in FIG. 4 to be decreasing, the torque reduction amount-determining part 63 operates to maintain the additional deceleration at the maximum steering speed, as mentioned above. Specifically, in chart (d), when the steering speed decreases toward the position B, the target additional deceleration indicated by the one-dot chain line also decreases along therewith, but the additional deceleration indicated by the solid line is maintained at its maximum value, until the vehicle reaches the position B.

On the other hand, when the absolute value of the steering angle is determined, in the step S21 depicted in FIG. 4, to be maintained constant or to be decreasing, the torque reduction amount-determining part 63 operates to obtain the deceleration reduction amount in the step S27, and reduce the additional deceleration by the obtained deceleration reduction amount, as mentioned above. In chart (d), the torque reduction amount-determining part 63 operates to reduce the additional deceleration to cause a reduction rate of the additional deceleration to become gradually smaller, i.e., to cause a slope of the solid line indicative of a change in the additional deceleration to become gradually gentler.

Chart (e) is a time chart presenting a change in the torque reduction amount determined based on the additional deceleration presented in chart (d). In chart (e), the horizontal axis represents time, and the vertical axis represents the torque reduction amount.

As mentioned above, the torque reduction amount-determining part 63 operates to determine a value of the torque reduction amount required for realizing the current-cycle additional deceleration, based on parameters such as current vehicle speed, transmission gear stage and road grade. Thus, in the case where respective values of these parameters are constant, the torque reduction amount is determined such that it changes in the same pattern as that of the additional deceleration presented in chart (d).

Chart (f) is a time chart presenting changes in the basic target torque before and after being smoothed by the torque variation filter 67. In chart (f), the horizontal axis represents time, and the vertical axis represents torque. Further, in chart (f), the dotted line indicates the basic target torque before being smoothed by the torque variation filter 67, and the solid line indicates the basic target torque after being smoothed by the torque variation filter 67.

The basic target torque determined so as to realize the target acceleration set based on current accelerator position, vehicle speed, transmission gear stage and others is likely to have a steep variation due to various disturbances or noises, as indicated by the dotted line in chart (f). By subjecting this basic target torque to smoothing using the torque variation filter 67, the steep variation is suppressed as indicated by the solid line in chart (f), and thus rapid acceleration and deceleration of the vehicle is suppressed.

Chart (g) is a time chart presenting a change in the fuel injection-controlling final target torque determined based on the basic target torque and the torque reduction amount. In chart (g), the horizontal axis represents time, and the vertical axis represents torque. Further, in chart (g), the dotted line indicates the smoothed basic target torque presented in chart (f), and the solid line indicates the fuel injection-controlling final target torque.

As described with reference to FIG. 3, the final target torque-determining part 65 operates to subtract the torque reduction amount determined by the torque reduction amount determination processing subroutine in the step S5, from the basic target torque after being smoothed in the step S4, to thereby determine the fuel injection-controlling final target torque. In the basic target torque and the torque reduction amount to be used for determining the final target torque, only the basic target torque determined based on the vehicle driving state including the manipulation of the accelerator pedal is subjected to smoothing using the torque variation filter 67. In other words, in regard to a part of a temporal variation of the final target torque corresponding to the torque reduction amount determined based on the manipulation of the steering wheel as the vehicle driving state other than the manipulation of the accelerator pedal, the torque reduction amount is not subjected to smoothing using the torque variation filter 67. Thus, as indicated by the solid line in chart (g), the torque reduction amount is directly reflected on the final target torque without being smoothed by the torque variation filter 67.

Due to such a change in the fuel injection-controlling final target torque corresponding to a change in the torque reduction amount, when the operation state of the engine E changes from the diffusion combustion region to the premixed combustion region, the engine control part 69 operates to maintain the combustion mode of the engine E in the diffusion combustion mode, as described in connection with the step S35 in FIG. 6. On the other hand, due to the above change in the fuel injection-controlling final target torque corresponding to a change in the torque reduction amount, when the operation state of the engine E changes from the premixed combustion region to the diffusion combustion region, the engine control part 69 operates to switch the combustion mode of the engine E from the premixed combustion mode to the diffusion combustion mode, as described in connection with the steps S33 and S37 in FIG. 6.

Chart (h) is a time chart presenting a change in the EGR and turbocharger-controlling final target torque determined based on the basic target torque. In chart (h), the horizontal axis represents time, and the vertical axis represents torque.

As described with reference to FIG. 3, the final target torque-determining part 65 operates to determine the basic target torque after being smoothed in the step S4, as the EGR and turbocharger-controlling final target torque for controlling the turbocharger 5 and the EGR device 43. Thus, as presented in chart (h), the EGR and turbocharger-controlling final target torque temporally changes in the same pattern as that of the temporal change in the smoothed basic target torque.

Chart (i) is a time chart presenting a change in the required fuel injection amount determined based on the fuel injection-controlling final target torque. In chart (i), the horizontal axis represents time, and the vertical axis represents the required fuel injection amount. Further, in chart (i), the dotted line indicates the required fuel injection amount corresponding to the smoothed basic target torque presented in chart (f), and the solid line indicates the required fuel injection amount corresponding to the fuel injection-controlling final target torque presented in chart (g).

In the example in chart (i), the engine control part 69 operates to control, by a fuel injection amount to be injected from the fuel injector 20, a part of a temporal variation of the fuel injection-controlling final target torque set in the step S6, corresponding to the torque reduction amount. Thus, as indicated by the solid line in chart (i), the required fuel injection amount temporally changes in the same pattern as that of the fuel injection-controlling final target torque presented in chart (g).

Chart (j) is a time chart representing the target in-cylinder oxygen concentration and an actual in-cylinder oxygen concentration, in the case where the fuel injection amount is controlled as presented in chart (i). In chart (j), the horizontal axis represents time, and the vertical axis represents the in-cylinder oxygen concentration. Further, in chart (j), the dotted line indicates the target in-cylinder oxygen concentration determined based on the EGR and turbocharger-controlling final target torque presented in chart (h), and the solid line indicates the actual in-cylinder oxygen concentration (i.e., the in-cylinder oxygen concentration estimated by the engine control part 69).

Chart (k) is a time chart presenting a change in the difference between the actual in-cylinder oxygen concentration and the target in-cylinder oxygen concentration. In chart (k), the horizontal axis represents time, and the vertical axis represents the difference between the actual in-cylinder oxygen concentration and the target in-cylinder oxygen concentration.

When the fuel injection amount is controlled to realize the fuel injection-controlling final target torque, as indicated by the solid line in chart (i), the in-cylinder oxygen concentration will change according to this fuel injection amount. That is, when the fuel injection amount starts to decrease according to a decrease in the fuel injection-controlling final target torque corresponding to the torque reduction amount, an amount of oxygen consumed by combustion decreases. Thus, as indicated in the solid line in chart (j), the in-cylinder oxygen concentration starts to increase at timing T1 delayed from start of the decrease in the fuel injection amount. After that, when the fuel injection amount increases correspondingly to an increase in the fuel injection-controlling final target torque, the amount of oxygen consumed by combustion increases. Thus, the in-cylinder oxygen concentration starts to decrease at timing T2 delayed from start of the increase in the fuel injection amount.

On the other hand, a change in the torque reduction amount is not reflected on the EGR and turbocharger-controlling final target torque, and thus the EGR and turbocharger-controlling final target torque temporally changes in the same pattern as that a temporal change in the smoothed basic target torque, as presented in chart (h), so that the target in-cylinder oxygen concentration set based on the EGR and turbocharger-controlling final target torque temporally changes in the same pattern as that the temporal change in the smoothed basic target torque without changing according to the torque reduction amount, as indicated by the dotted line in chart (j).

Assume a situation where the fuel injection-controlling final target torque decreases as indicated by the solid line in chart (g), and thus the operation state of the engine E changes from the diffusion combustion region to the premixed combustion region. In this situation, if the combustion mode of the engine E is changed from the diffusion combustion mode to the premixed combustion mode, the in-cylinder oxygen concentration needs to be reduced, as compared to during the diffusion combustion mode. However, the in-cylinder oxygen concentration rather rises according to the decrease in the fuel injection-controlling final target torque, as indicated by the solid line in chart (j), so that a difference between the actual in-cylinder oxygen concentration and a target in-cylinder oxygen concentration suitable for the premixed combustion mode is increased, thereby leading to occurrence of abnormal combustion such as premature ignition. Therefore, when the operation state of the engine E changes from the diffusion combustion region to the premixed combustion region, the engine control part 69 operates to maintain the combustion mode of the engine E in the diffusion combustion mode, so that it is possible to avoid the need to reduce the in-cylinder oxygen, and thus suppress an increase in the difference between the actual in-cylinder oxygen concentration and the target in-cylinder oxygen concentration.

On the other hand, when, due to a decrease in the fuel injection-controlling final target torque, the operation state of the engine E changes from the premixed combustion region to the diffusion combustion region, and the combustion mode of the engine E is changed from the premixed combustion mode to the diffusion combustion mode, the in-cylinder oxygen concentration needs to be raised, as compared to during the diffusion combustion mode. Specifically, as indicated by the solid line in chart (j), the in-cylinder oxygen concentration rises according to a decrease in the fuel injection-controlling final target torque, and the target in-cylinder oxygen concentration also rises in response to the switching of the combustion mode from the premixed combustion mode to the diffusion combustion mode, so that it is possible to suppress an increase in a difference between the actual in-cylinder oxygen concentration and a target in-cylinder oxygen concentration suitable for the diffusion combustion mode.

Therefore, the engine control part 69 is capable of, when the operation state of the engine E changes from the premixed combustion region to the diffusion combustion region, switching the combustion mode of the engine E from the premixed combustion mode to the diffusion combustion mode, i.e., setting a suitable combustion mode for the operation state of the engine E, as mentioned above.

Further, when the combustion mode of the engine E is the premixed combustion mode, the engine control part 69 operates to gradually retard the fuel injection timing of the main injection as the difference between the actual in-cylinder oxygen concentration and the target in-cylinder oxygen concentration becomes larger as presented in chart (k), according to a decrease in the fuel injection-controlling final target torque. As a result, the center of gravity of combustion is retarded. Thus, even in a situation where the difference between the actual in-cylinder oxygen concentration and the target in-cylinder oxygen concentration increases, it becomes possible to suppress a rapid rise in in-cylinder pressure around top-dead-center of compression stroke to thereby suppress occurrence of abnormal combustion or knock noise.

On the other hand, when the combustion mode of the engine E is the diffusion combustion mode, the engine control part 69 operates to gradually reduce the fuel injection amount in the pre-stage injection(s) along with an increase in the difference between the estimated actual in-cylinder oxygen concentration and the target in-cylinder oxygen concentration. As a result, enhancement in ignitability by the pre-stage injection(s) is suppressed. Thus, even in the situation where the difference between the actual in-cylinder oxygen concentration and the target in-cylinder oxygen concentration increases, it becomes possible to suppress a rapid combustion during the main combustion to thereby suppress generation of knock noise.

Chart (1) is a time chart presenting a change in yaw rate (actual yaw rate) generated in the vehicle being steered as presented in chart (b), when the fuel injection amount is controlled based on the fuel injection-controlling final target torque presented in chart (i), and a change in actual yaw rate generated in the vehicle when control corresponding to the torque reduction amount presented in chart (e) is not performed (i.e., control of the fuel injection amount is performed based on the smoothed basic target torque indicated by the dotted line in chart (g)). In chart (1), the horizontal axis represents time, and the vertical axis represents yaw rate. Further, in chart (1), the solid line indicates a change in the actual yaw rate when the control of the fuel injection amount is performed based on the fuel injection-controlling final target torque, and the dotted line indicates a change in the actual yaw rate when the control corresponding to the torque reduction amount is not performed.

After clockwise steering is started at the position A, when the torque reduction amount is increased as presented in chart (e) along with an increase in clockwise steering speed, a load applied to the front road wheels as steerable road wheels of the vehicle is increased. As a result, a frictional force between each of the front road wheels and a road surface is increased, and a cornering force of the front road wheels is increased, thereby providing an improved turn-in ability of the vehicle. That is, as depicted in chart (l), in the intermediate zone between the position A and the position B, when the control of the fuel injection amount is performed based on the fuel injection-controlling final target torque reflecting the torque reduction amount (solid line), a larger clockwise (CW) yaw rate is generated in the vehicle, as compared to the case where the control corresponding to the torque reduction amount is not performed (dotted line).

In addition, as depicted in charts (d) and (e), when the steering speed is gradually reduced toward the position B, the torque reduction amount is maintained at its maximum value, although the target additional deceleration is reduced, so that it is possible to maintain the load applied to the front road wheels and keep up the turn-in ability of the vehicle, as long as the tuning of the steering wheel is continued.

Further, when the absolute value of the steering angle is maintained constant during traveling from the position B to the position C, the torque reduction amount is smoothly reduced. Thus, in response to completion of the turning of the steering wheel, the load applied to the front road wheels can be gradually reduced to gradually reduce the cornering force of the front road wheels, thereby restoring the output torque of the engine E, while stabilizing a vehicle body.

Next, some modifications of the above embodiment will be described.

Although the above embodiment has been described based on an example in which the torque reduction amount-determining part 63 is configured to obtain the target additional deceleration based on the steering speed, and determine the torque reduction amount based on the obtained target additional deceleration, the torque reduction amount-determining part 63 may be configured to determine the torque reduction amount based on any driving state of the vehicle other than the manipulation of the accelerator pedal (e.g., steering angle, yaw rate, or slip ratio).

For example, the torque reduction amount-determining part 63 may be configured to calculate a target yaw acceleration to be generated in the vehicle, based on a target yaw rate calculated from the steering angle and the vehicle speed, and a yaw rate input from a yaw rate sensor, and obtain the target additional deceleration based on the calculated target yaw acceleration to determine the torque reduction amount. Alternatively, a lateral acceleration generated along with turning of the vehicle may be detected by an acceleration sensor, and the torque reduction amount may be determined based on the determined lateral acceleration. Alternatively, the torque reduction amount-determining part 63 may be configured to determine the torque reduction amount, based on any demand different from the target additional deceleration (e.g., a torque required for cancelling out vibration of a powertrain during acceleration/deceleration).

Although the above embodiment has been described based on an example in which the engine control part 69 is configured to control the turbocharger 5 based on the EGR and turbocharger-controlling final target torque which does not reflect the torque reduction amount (i.e., based on the smoothed basic target torque), the engine control part 69 may be configured to control the turbocharger 5 based on an EGR and turbocharger-controlling final target torque reflecting the torque reduction amount. In this case, the engine control part 69 is configured to restrict controlling the turbocharger 5 according to a change in the final target torque corresponding to a change in the torque reduction amount. For example, the final target torque-determining part 65 may be configured to, in the step S10 of the engine control processing routine depicted in FIG. 3, multiply the torque reduction amount determined in the torque reduction amount determination processing subroutine in the step S5 by a correction coefficient of less than 1 to obtain a corrected torque reduction amount, and then subtract the corrected torque reduction amount from the basic target torque after being smoothed in the step S4, to thereby determine an EGR and turbocharger-controlling final target torque for controlling the turbocharger 5 and the EGR device 43. In the EGR and turbocharger-controlling final target torque determined in this manner, a change in the final target torque corresponding to a change in the torque reduction amount is reduced, as compared to the fuel injection-controlling final target torque obtained by directly subtracting the torque reduction amount from the basic target torque, so that it is restricted to control the turbocharger 5 according to a change in the final target torque corresponding to a change in the torque reduction amount.

Although the above embodiment has been described based on an example in which the turbocharger 5 is constructed as the two-stage supercharging system comprising the large turbocharger 5*a* and the small turbocharger 5*b*, the turbocharger 5 may be constructed as a variable geometry turbocharger (VGT) comprising a plurality of movable flaps provided to surround the entire circumference of a turbine, wherein a cross-sectional flow area (cross-sectional nozzle area) with respect to the turbine can be changed by the movable flaps. In this case, the engine control part 69 may be configured to control an opening degree of the flaps, based on the target supercharging pressure.

Next, advantageous effects of the engine control device according to each of the above embodiment and the modifications of the embodiment will be described.

First of all, the engine control part 69 is configured to control the engine E to output the fuel injection-controlling final target torque reflecting the torque reduction amount determined based on the vehicle driving state other than the manipulation of the acceleration pedal, so that it is possible to control the engine to obtain the torque reduction amount with high responsivity with respect to the vehicle driving state other than the manipulation of the accelerator pedal, to thereby quickly apply a load to front road wheels. This makes it possible to control the engine to accurately realize vehicle behavior intended by a driver.

Further, the engine control part 69 is configured, when the operation state of the engine E changes from the diffusion combustion region to the premixed combustion region, due to a change in the final target torque corresponding to a change in the torque reduction amount, to maintain the combustion mode of the engine E in the diffusion combustion mode, so that it is possible to avoid the need to reduce the in-cylinder oxygen concentration in response to switching of the combustion mode from the diffusion combustion mode to the premixed combustion mode, and thus suppress an increase in the difference between the actual in-cylinder oxygen concentration and the target in-cylinder oxygen concentration for the combustion mode. This makes it possible to suppress generation of knock noise due to abnormal combustion such as premature ignition.

In particular, the torque reduction amount-determining part 63 is configured to determine the torque reduction amount according to the manipulation of the steering wheel of the vehicle. Thus, a temporal change in the torque reduction amount determined based on the manipulation of the steering wheel can be reflected on a temporal change in the final target torque, so that it is possible to quickly add, to the vehicle, deceleration according to the manipulation of the steering wheel by a driver to thereby apply a load to front road wheels to quickly increase a cornering force, thereby improving responsivity with respect to the manipulation of the steering wheel. This makes it possible to control the engine to accurately realize vehicle behavior intended by the driver, while suppressing generation of knock noise due to abnormal combustion such as premature ignition.

Further, the engine control part 69 is configured, when the operation state of the engine E changes from the premixed combustion region to the diffusion combustion region, due to a change in the final target torque corresponding to a change in the torque reduction amount, to switch the combustion mode of the engine E from the premixed combustion mode to the diffusion combustion mode. Thus, when the actual in-cylinder oxygen concentration rises according to a reduction in the fuel injection-controlling final target torque corresponding to a change in the torque reduction amount, the target in-cylinder oxygen concentration also rises in response to the switching of the combustion mode from the premixed combustion mode to the diffusion combustion mode, so that it is possible to suppress an increase in the difference between the actual in-cylinder oxygen concentration and the suitable in-cylinder oxygen concentration for the combustion mode, and thus appropriately set the combustion mode according to the operation state of the engine E, while suppressing generation of knock noise due to abnormal combustion such as premature ignition. This makes it possible to achieve enhanced combustion stability and improved emission quality.

Further, in the engine control device, the engine is a diesel engine comprising a fuel injector 20 for injecting fuel into a cylinder. Thus, the engine control device is capable of changing the fuel injection amount in the diesel engine, according to the fuel injection-controlling final target torque reflecting the torque reduction amount to thereby accurately realize a temporal change in the torque reduction amount determined based on the vehicle driving state other than the accelerator pedal, with high responsivity. This makes it possible to control the diesel engine so as to accurately realize vehicle behavior intended by a driver.

Further, the engine control part 69 is configured, when the fuel injection-controlling final target torque changes correspondingly to a change in the torque reduction amount, to correct the fuel injection parameter preliminarily set in association with the operation state of the engine E. Thus, even in a situation where a mismatch occurs between the target in-cylinder oxygen concentration and the actual in-cylinder oxygen concentration, due to a change in the fuel injection-controlling final target torque, the fuel injection parameter can be corrected to suppress a rapid rise in in-cylinder pressure and rapid combustion which would otherwise be caused by the mismatch, to thereby suppress generation of knock noise due to abnormal combustion such as premature ignition.

Further, when the combustion mode of the engine E is the diffusion combustion mode, the engine control part 69 is configured to reduce the fuel injection amount in the pre-stage injection(s), upon a change in the fuel injection-controlling final target torque corresponding to a change in the torque reduction amount. Thus, even in the situation where a mismatch occurs between the target in-cylinder oxygen concentration and the actual in-cylinder oxygen concentration, due to a change in the fuel injection-controlling final target torque, enhancement in ignitability by the pre-stage injection(s) can be suppressed to suppress rapid combustion during the main injection to thereby reliably suppress generation of knock noise.

Further, when the combustion mode of the engine E is the premixed combustion mode, the engine control part 69 is configured to retard the fuel injection timing of the main injection, upon a change in the fuel injection-controlling final target torque corresponding to a change in the torque reduction amount. Thus, even in the situation where a mismatch occurs between the target in-cylinder oxygen concentration and the actual in-cylinder oxygen concentration, due to a change in the fuel injection-controlling final target torque, the center of gravity of combustion can be retarded to suppress a rapid rise in in-cylinder pressure around top-dead-center of combustion stroke to thereby reliably suppress generation of knock noise.

Further, the engine control part 69 is configured, when the fuel injection-controlling final target torque changes correspondingly to a change in the torque reduction amount, to gradually increase the fuel injection parameter correction value along with an increase in the difference between the actual in-cylinder oxygen concentration and the target in-cylinder oxide concentration. Thus, even in a situation where the mismatch between the target in-cylinder oxygen concentration and the actual in-cylinder oxygen concentration is increased, the fuel injection parameter correction value can be increased to suppress a rapid rise in in-cylinder pressure and rapid combustion which would otherwise be caused by the mismatch, to thereby reliably suppress generation of knock noise due to abnormal combustion such as premature ignition.

LIST OF REFERENCE SIGNS

1: intake passage
5: turbocharger
5*a*: large turbocharger
5*b*: small turbocharger
5*c*: compressor bypass valve
5*d*: regulator valve
5*e*: waste gate valve
20: injector
41: exhaust passage
43: EGR device
60: PCM
61: basic target torque-determining part
63: torque reduction amount-determining part
65: final target torque-determining part
67: torque variation filter
69: engine control part
200: engine system
E: engine

What is claimed is:

1. A control device for an engine whose combustion mode is switchable according to an engine operation state, comprising:
    a basic target torque-determining part configured to determine a basic target torque based on a driving state of a vehicle including manipulation of an accelerator pedal;
    a torque reduction amount-determining part configured to determine a torque reduction amount based on a driving state of the vehicle other than the manipulation of the accelerator pedal;
    a final target torque-determining part configured to determine a final target torque based on the basic target torque and the torque reduction amount; and
    an engine control part configured to control the engine to output the final target torque,
    wherein the engine control part is configured, when the engine operation state is in a predetermined premixed combustion region, to set the combustion mode of the engine to a premixed combustion mode and configured, when the engine operation state is in a predetermined diffusion combustion region, to set the combustion mode of the engine to a diffusion combustion mode, and
    wherein the engine control part is configured, when the engine operation state changes from the diffusion combustion region to the premixed combustion region, due to a change in the final target torque corresponding to a change in the torque reduction amount, to maintain the combustion mode of the engine in the diffusion combustion mode.

2. The control device as recited in claim 1, wherein the torque reduction amount-determining part is configured to determine the torque reduction amount according to manipulation of a steering wheel of the vehicle.

3. The control device as recited in claim 1, wherein the engine control part is configured, when the engine operation state changes from the premixed combustion region to the diffusion combustion region, due to a change in the final target torque corresponding to a change in the torque reduction amount, to switch the combustion mode of the engine from the premixed combustion mode to the diffusion combustion mode.

4. The control device as recited in claim 1, wherein the engine is a diesel engine comprising a fuel injector for injecting fuel into a cylinder, and wherein the engine control part is configured to control the fuel injector to regulate a fuel injection amount so as to enable the diesel engine to output the final target torque.

* * * * *